UNITED STATES PATENT OFFICE.

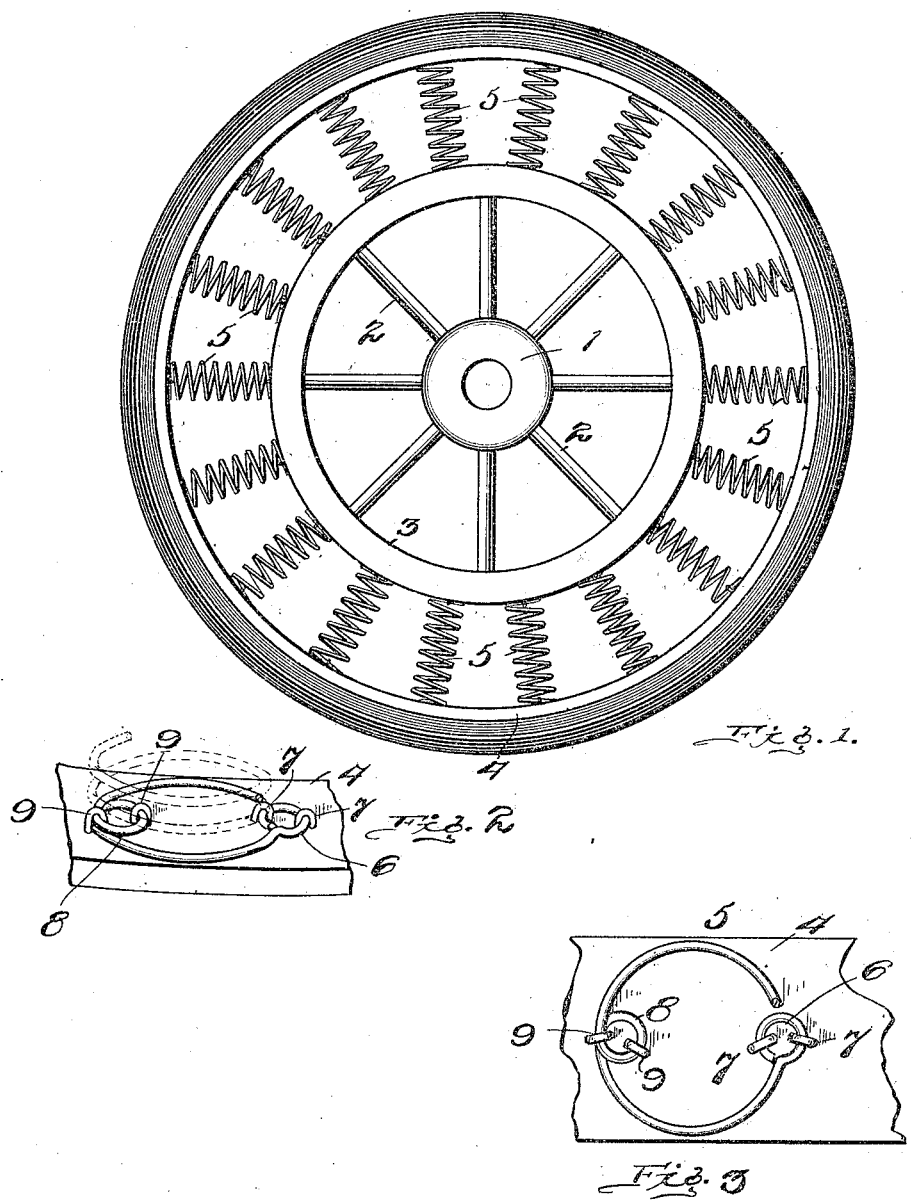

HAROLD PRATT FARNSWORTH, OF OWENSBORO, KENTUCKY.

AUTOMOBILE-TIRE.

981,627.

Specification of Letters Patent.   Patented Jan. 17, 1911.

Application filed April 7, 1910.   Serial No. 553,929.

*To all whom it may concern:*

Be it known that I, HAROLD P. FARNSWORTH, a citizen of the United States of America, residing at Owensboro, in the county of Daviess and State of Kentucky, have invented certain new and useful Improvements in Automobile-Tires, of which the following is a specification, reference being had therein to the accompanying drawing.

This invention relates to spring wheels for vehicles, and the principal object of the same is to provide novel means whereby springs may be employed to connect an inner rim to a felly so that said springs will absorb the shocks and jars incidental to the use of the wheels.

In connection with the foregoing the invention contemplates novel means whereby the ends of the springs may be rigidly connected to the rim and felly so that danger of slippage of the springs is prevented.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of a wheel constructed in accordance with this invention. Fig. 2 is a detail fragmentary perspective view showing the manner of fastening the ends of the springs to the felly and rim. Fig. 3 is a top plan view thereof.

Referring to said accompanying drawings, by numerals, 1 designates the hub of the improved wheel which is provided with the spokes 2 which carry the rim 3. A felly 4 surrounds the rim 3 in spaced relation and is connected therewith by the regularly spaced spiral springs 5 which radiate from rim 4. Said springs have their ends curved to form a small flat circle or loop 6, so that said loops will lie flat on the rim and felly and be rigidly but detachably fastened thereto by the oppositely disposed staples 7. The end convolutions of each spring at a point opposite loop 6, are twisted or crossed, to provide a flat loop 8, which is fastened to the rim or felly by means of the staples 9.

It will be seen from the foregoing that the end loops of the springs provide simple means for rigidly connecting the ends of the springs to the felly and the rim, so that said springs will be retained in position to absorb the shocks and jars incidental to the use of the wheel.

What I claim as my invention is:—

A spring wheel comprising a hub, a rim, and a felly, spiral springs interposed between the rim and felly, said springs having their opposite ends curved to provide flat loops, the end convolutions of each spring at a point opposite said loops being twisted to provide secondary loops, and means for connecting said loops to the rim and felly.

In testimony whereof I hereunto affix my signature in presence of two witnesses.

HAROLD PRATT FARNSWORTH.

Witnesses:
S. S. McCARTY,
P. A. YAGER.